(12) United States Patent
Manthey et al.

(10) Patent No.: US 11,494,285 B1
(45) Date of Patent: Nov. 8, 2022

(54) STATIC CODE ANALYSIS TOOL AND CONFIGURATION SELECTION VIA CODEBASE ANALYSIS

(71) Applicant: Amazon Technologies, Inc., Seattle, WA (US)

(72) Inventors: Norbert Manthey, Dresden (DE); Michael Tautschnig, London (GB)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 17/038,044

(22) Filed: Sep. 30, 2020

(51) Int. Cl.
*G06F 11/36* (2006.01)
*G06N 20/00* (2019.01)

(52) U.S. Cl.
CPC ......... *G06F 11/3616* (2013.01); *G06N 20/00* (2019.01)

(58) Field of Classification Search
USPC ........................................................ 717/126
See application file for complete search history.

(56) References Cited

U.S. PATENT DOCUMENTS

| | | | | |
|---|---|---|---|---|
| 10,496,927 B2* | 12/2019 | Achin | ................. | G06N 5/02 |
| 10,733,344 B2* | 8/2020 | Rafaila | ................. | G06N 20/00 |
| 2014/0157239 A1* | 6/2014 | Goetsch | ............. | G06F 11/3604 717/126 |
| 2014/0330758 A1* | 11/2014 | Yu | ........................... | G06N 5/02 706/57 |
| 2015/0379404 A1* | 12/2015 | Ezick | ....................... | G06F 17/11 706/57 |
| 2019/0108196 A1* | 4/2019 | Hannu | ................. | G06K 9/6256 |
| 2019/0317885 A1* | 10/2019 | Heinecke | ............ | G06F 11/3616 |
| 2021/0132915 A1* | 5/2021 | Ivankovic | .............. | G06N 20/00 |
| 2021/0142197 A1* | 5/2021 | Katz | ...................... | G06N 7/005 |

FOREIGN PATENT DOCUMENTS

WO    WO-2018075995 A1 * 4/2018 ............. G06N 20/00

OTHER PUBLICATIONS

Sultanow et al.; "Machine Learning Based Static Code Analysis for Software Quality Assurance," 2018 Thirteenth International Conference on Digital Information Management (ICDIM) pp. 156-161; 2018 (Year: 2018).*

(Continued)

*Primary Examiner* — Qing Chen
*Assistant Examiner* — Clint Thatcher
(74) *Attorney, Agent, or Firm* — Nicholson De Vos Webster & Elliott LLP

(57) ABSTRACT

Techniques for static code analysis tool and configuration recommendation via codebase analysis are described. Multiple codebases are tested using multiple static analysis tools and corresponding configurations, and a machine learning model is trained based on the results and characteristics of the codebases. Users may provide a codebase to be analyzed and job preferences indicating what characteristics of static analysis they desire, the codebase may be analyzed to generate input data for the model, and the model may identify one or more similar testing runs. These candidate runs may be filtered and/or ordered based on the user's stated job preferences, and the resulting tools and configurations associated with these runs may be returned to the user or used to perform static analysis of the user's codebase.

20 Claims, 9 Drawing Sheets

(56) References Cited

OTHER PUBLICATIONS

Ruchika et al.; "Building an Effective Recommender System Using Machine Learning Based Framework"; 2017 International Conference on Infocom Technologies and Unmanned Systems (Trends and Future Directions) (ICTUS) pp. 215-219; 2017 (Year: 2017).*
Tulsian et al.; "Mux: Algorithm Selection for Software Model Checkers"; In Proceedings of the 11th Working Conference on Mining Software Repositories (pp. 132-141); 2014 (Year: 2014).*
Kerschke et al.; "Automated Algorithm Selection: Survey and Perspectives"; Evolutionary Computation, 27(1), pp. 3-45; 2019 (Year: 2019).*
Xu et al.; "SATzilla: Portfolio-Based Algorithm Selection for SAT"; Journal of Artificial Intelligence Research, 32, (pp. 565-606); 2008 (Year: 2008).*
Lindauer, et al. "Autofolio: An Automatically Configured Algorithm Selector"; Journal of Artificial Intelligence Research, 53, (pp. 745-778); 2015 (Year: 2015).*
Gomes at al.; "Algorithm Portfolios"; Artificial Intelligence 126.1-2 (pp. 43-62); 2001 (Year: 2001).*
"What Is Model Training?" Oden Technologies website [full url in ref.]; Jul. 30, 2020 (Year: 2020).*
Demyanova, Yulia et al., "Empirical Software Metrics for Benchmarking of Verification Tools," Form Methods Sys Des, Jan. 10, 2017, 28 pages.

\* cited by examiner

Services

Code Service

▶ Source
   Repositories
   Code
   Pull Requests
   Commits
   Branches
   Tags ▲ Build ▲ Deploy ▶ Static Analysis
   *Tool Selection*
   Pipeline Integration user@example.com | Oregon | Support

Static Analysis

○ TOOL SELECTION: ONE-TIME ANALYSIS ⏎ 202

● TOOL SELECTION: TOOL SELECTION FOR PIPELINE ⏎ 204

○ USE SELECTED STATIC ANALYSIS TOOL(S) ⏎ 205

[ TOOL 'A'  ▼ ] ⏎ 206

● AUTOMATICALLY SELECT STATIC ANALYSIS TOOL(S) ⏎ 207

*CANDIDATE OPEN SOURCE TOOLS* ⏎ 208

☑ TOOL 'A'    ☑ TOOL 'C'
    ☑ TOOL 'B'    ☑ TOOL 'D'

*CANDIDATE LICENSED TOOLS* ⏎ 210

☑ TOOL 'E'    ☐ ***TOOL 'I' \*\****
    ☑ TOOL 'F'    ☑ ***TOOL 'J' \*\****
    ☑ TOOL 'G'    ☐ ***TOOL 'K' \*\****
    ☐ ***TOOL 'H' \*\****

*\*\* = CURRENTLY UNLICENSED,*
    *BUT AVAILABLE IN TOOL LIBRARY*

DRIVING FACTOR(S) FOR TOOL SELECTION ⏎ 212
    ◉ FAST ANALYSIS TIME
    ◉ VERY THOROUGH
    ◉ LOW RESOURCE USAGE

[ CANCEL ]    [ SAVE ]

*FIG. 2*

STATIC CODE ANALYSIS TOOL AND CONFIGURATION SELECTION VIA CODEBASE ANALYSIS

BACKGROUND

Static code analysis is a technique of debugging a computer application that includes analyzing an application's source code before a program is run. This analysis is usually done by analyzing the code against a given set of rules or coding standards, and can address code vulnerabilities, code smells, and adherence to commonly accepted coding standards. Statis code analysis is commonly performed at various points of the software development life cycle, often occurring at various stages after a "code development" phase though before "unit" or "integration" testing phases. By way of example, in some continuous integration (CI) and continuous delivery (CD) pipelines, static analysis is incorporated as part of a quality gate for code promotion. Among other benefits, the ability to identify weaknesses in code and to ensure the code adheres to strict development standards helps to reduce potential bugs or regressions in production environments.

BRIEF DESCRIPTION OF DRAWINGS

Various embodiments in accordance with the present disclosure will be described with reference to the drawings, in which:

FIG. 2 is a diagram illustrating an exemplary user interface for user-configured static code analysis tool and configuration selection via codebase analysis according to some embodiments.

DETAILED DESCRIPTION

Figure 1:
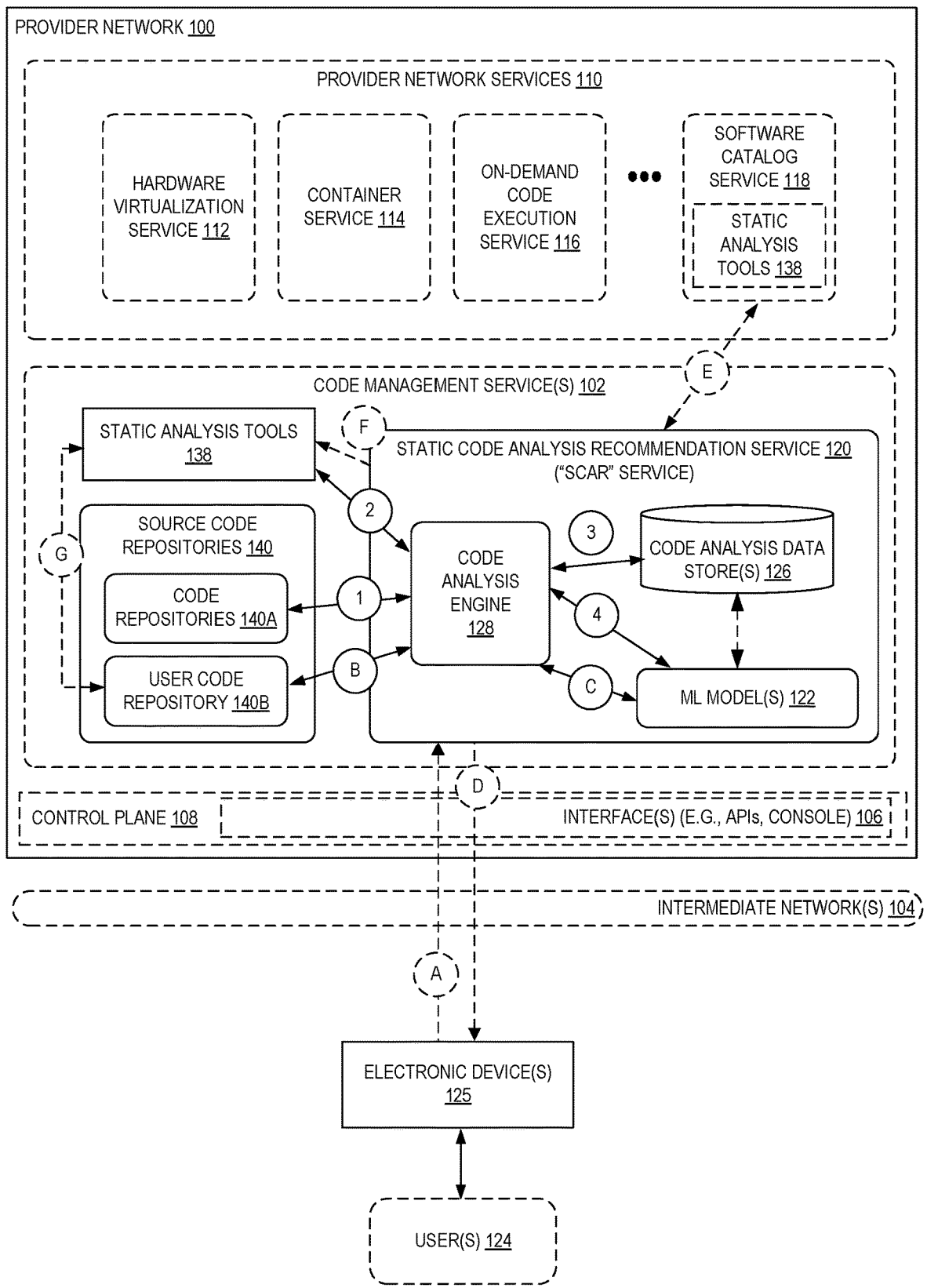
FIG. 1 is a diagram illustrating an environment for static code analysis tool and configuration selection via codebase analysis according to some embodiments.

The present disclosure relates to methods, apparatus, systems, and non-transitory computer-readable storage media for static code analysis tool and configuration recommendation via codebase analysis. According to some embodiments, a static code analysis recommendation service, or "SCAR service," intelligently identifies a candidate static code analysis tool—and its associated configuration—for a user based on both the preferences of the user as well as characteristics of the user's codebase. As is known in the field, automated static analysis of software promises to deliver increased confidence in the quality and security of programs. When applying static analysis, users have a choice of commercial and free and open-source tools that differ, e.g., in the source languages that they support, the precision and scalability of their analysis, or their trade-off between false positives and false negatives. As there are many different static analysis tools in existence with both subtle and obvious differences (e.g., Klocwork, Coverity, PVS-Studio, Infer, Fortify, CBMC, and many others), and as many of these tools are useful for slightly different scenarios, it is extremely difficult for software developers to choose a "best" tool for use with their application, especially as the best tool may change over time as the application itself changes. These problems are compounded because many static analysis tools require substantial time and computing resources to perform each analysis, so running multiple tools is often non-practical. Moreover, as many of these tools require relatively expensive licenses, users are often unable to test a large variety of tools without significant expenditures, large amount of time setting up custom configurations, and the like.

Accordingly, embodiments disclosed herein provide a SCAR service that can utilize knowledge gained from many previous uses of different static analysis tools, using different configurations, for different types of applications, and efficiently apply this knowledge toward intelligently selecting one—or multiple—different static analysis tools (and associated configurations thereof) for a particular user's codebase based on the particular preferences of the user, e.g., whether the user desires a fast analysis, whether the user desires a thorough or deep analysis, whether the user has a minimum or maximum desired performance level (e.g., a maximum allowable false positive rate), whether the user desires an analysis that does not utilize large amounts of computing resources (e.g., in terms of regular or virtual central processing unit (CPU) use, memory utilization, storage utilization, network bandwidth utilization), or the like.

For example, in some embodiments the SCAR service automates the application of static analysis by supporting users in selecting a most suitable tool via machine learning (ML) based techniques (e.g., clustering, nearest neighbor, etc.) to rank various tools based on properties of the target software as well as user preferences. In some embodiments, the SCAR service learns configurations that work well and makes recommendations based at least in part on some measure of similarity of codebases, e.g., based on one or more of the distribution of programming languages in the target software, the size of the code base, the type(s) of programs called during the build process of the target software, information about the internals of the code base (e.g., abstract syntax tree (AST) information, types of data structures and/or code constructs being used, information about identified design patterns), etc.

For further detail, FIG. 1 is a diagram illustrating an environment for static code analysis tool and configuration selection via codebase analysis according to some embodiments. In FIG. 1, the static code analysis recommendation service 120 (or, "SCAR" service 120) is implemented within a provider network 100, and may be implemented as a collection of one or more software applications executed by one or multiple computing devices. However, in some embodiments, the SCAR service 120 may be implemented in whole or in part as a software application that may be provided to users and executed in the user's computing environment, for example, on a user's development computer or in a user's compute instance hosted in some provider network or data center. Thus, in some embodiments all aspects of the SCAR service 120 may be bundled in a stand-alone application, though in other embodiments some portions of the SCAR service 120 could be executed "locally" by a user while other portions (e.g., a data store, a hosted machine learning model, etc.) remain in a remote provider network.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services 110/102, such as a hardware virtualization service 112 that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., user 124) may interact with a provider network 100 across one or more intermediate networks 104 (e.g., the internet) via one or more interface(s) 106, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 may be part of, or serve as a front-end to, a control plane 108 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network/intermediate network 104 (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service 112 or container service 114) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service 116 (referred to in various embodiments as a function compute service, functions service, cloud functions service, functions as a service, or serverless computing service) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The hardware virtualization service 112 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 114 can be a container orchestration and management service (referred to in various implementations as a container service, cloud container service, container engine, or container cloud service) that allows users of the cloud provider network to instantiate and manage containers. In some embodiments the container service 114 may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Another service 110 referred to as a software catalog service 118 (or marketplace) provides a digital catalog filled with software listings from a variety of software vendors that makes it easy for users to find, test, buy, and deploy software that can be run in the provider network 100. For example, the software catalog service 118 may include static analysis tools 138 that can be obtained/licensed by a user and utilized (e.g., as part of a code management service 102 that stores code of a codebase in one or more source code repositories 140, as part of a user application via the hardware virtualization service 112, container service 114, etc.) to analyze a codebase. Generally, a codebase may be a collection of one or more files or objects storing computing code, such as source code, libraries, etc., of a software application. However, a codebase may also refer to a collection of files or objects for other purposes, such as a set of objects for hardware descriptions, analysis, verification, etc., such as Verilog or VHDL files or configurations.

As illustrated, the SCAR service 120 may operate as part of one or more code management services 102, or in conjunction with one or more code management services 102. A code management service 102 may provide various functionalities associated with software code in the form of a codebase or repository. For example, various types of code management service 102 may exist such as a managed source control service that provides code storage and version-control, a code deployment service that automates software deployments to locations within the provider network 100 or outside the provider network 100, a fully-managed continuous delivery service that helps users automate release pipelines for fast and reliable application and infrastructure updates by automating the build, test, and/or deploy phases of a release process when there is a code change based on the defined release model, allowing users to rapidly and reliably deliver features and updates.

For example, the SCAR service 120 may configure itself by learning about static analysis tool performance under various conditions as shown by circles (1)-(4). In some embodiments, a code analysis engine 128 (e.g., an orchestration type application implemented in software by one or more computing devices) may at one point in time (or periodically) analyze a set of code repositories 140A at circle (1) using a set of static analysis tools 138. As one example, a code analysis engine 128 may analyze various software packages, e.g., packages of an open-source software entity such as a Unix or Linux distribution.

For each such repository, the code analysis engine 128 may analyze the repository at one or multiple points in time (e.g., once, or after each "commit" or "merge" to the project, after a commit made to fix a bug, etc.), and at each such point the code analysis engine 128 may generate values (or features) corresponding to a set of codebase characteristics, including but not limited to a primary programming language of the codebase, a code complexity metric known to those of skill in the art, a length of the codebase, one or more identifiers of whether the codebase has a particular feature (e.g., uses concurrency such as pthreads (POSIX Threads) calls, uses particular encryption libraries, etc.), a maintainability index value, an inheritance depth value, or other characteristics that may or may not be well-supported by various static analysis tools.

In some embodiments, the code analysis engine 128 may then run one or multiple different static analysis tools—each using one or multiple different configurations—at these points in time. Additionally, or alternatively, different runs can be made with a same tool but with different code "checkers" for different defect classes enabled or disabled; for example, in some embodiments a codebase may be first analyzed with all checkers enabled (or some reasonable default set of checkers), and afterwards generate recommendations for each sub-checker of the measured analysis tool configuration. The outputs from these various tools may optionally be compared to determine the existence of a bug or issue, such as when a majority (or some other threshold) of the tools identify a bug, a run that does not identify such a bug or issue may be deemed to have made a "false negative." Similarly, when a majority (or some other threshold) of the tools do not identify a bug, a run that does identify a bug or issue may be deemed to have made a "false positive." However, these scenarios may be double-checked by a human user, e.g., to determine whether a minority of tools were acting properly, e.g., that they found something or did not find something, but the others erroneously did the opposite. Further, for a majority (or other threshold) of tools that find a bug or issue, each tool may have a true positive indicated; and when this threshold of tools do not find a bug that some other tool may (erroneously) find, these tools may have a true negative indicated.

After each run, the code analysis engine 128 may record as part of a job record various job result values, ranging from performance evaluation metrics (e.g., an accuracy score, or one or more of a count or rate of true positives, true negatives, false positives, false negatives, etc.) to run characteristics (e.g., an amount of time required for the run, a resource usage such as one or more of an amount of CPU cycles or time used, an maximum or average amount of memory (e.g., RAM) used, an amount of network bandwidth used, an amount of persistent storage used, etc.).

During or after each run, the code analysis engine 128 may also record as part of the job record an identifier of the static analysis tool that was used and a set of zero, one, or more configurations used for the tool. As is known to those of skill in the art, many static analysis tools have various options available for use, such as a higher aggressiveness (that may find comparatively more true positives but potentially more false positives) or lower aggressiveness (that may find comparatively more false negatives but potentially more false positives) setting, a set of flags indicating types of issues to look for or analyses to perform, or the like. In this manner, the code analysis engine 128 can potentially cause, for each of one or more tools, a tool to be run under different configurations to see how their results differ, their resource usage differs, and the like.

Thus, as shown at circle (3), the code analysis engine 128 may persist these job records to one or more code analysis data stores 126, which optionally could be offered by another service of the provider network such as a database service (e.g., relational, NoSQL, etc.). Examples of these job records are shown later with regard to FIG. 4.

The code analysis engine 128 may then use these job records to train one or more machine learning models; as one example, a clustering type algorithm such as a k-nearest neighbor (KNN) or k-means algorithm, such that when the one or more machine learning models are provided input codebase features, the one or more machine learning models can identify one or more other jobs that analyzed similar codebases. The one or more machine learning models may be trained using a machine learning service of the provider network 100, and thereafter deployed or hosted (e.g., in association with an endpoint) via the machine learning service. Thereafter, the code analysis engine 128 may perform inferences using the one or more machine learning models by sending requests (e.g., HTTP GET request messages) to the associated endpoint(s) and receiving inferences (e.g., a set of zero, one, or more associated job records or identifiers thereof) in response. At this point, the SCAR service 120 is ready to serve user requests.

Thereafter, a user 124 via a computing device (e.g., electronic device 125) may send a request at optional circle (A) to the SCAR service 120 to cause the SCAR service 120 to recommend one or more static analysis tools for a particular user code repository 140B, which may be located within the provider network 100 or external to the provider network 100. This request (or set of requests) may be sent by the electronic device 125 may be made responsive to the user 124 navigating one or more graphical user interfaces (e.g., of a web-based console, standalone application, etc.) associated with the SCAR service 120 itself or associated with a code management service 102. For example, the user 124 may seek a one-time recommendation of a static code analysis took, or may seek to configure a static code analysis tool to be used that may be recommended by the SCAR service 120 once, periodically, or every time a static code analysis tool is to be used. For example, the user 124 may seek to configure a pipeline stage of a code deployment service so that a static code analysis tool is invoked at one or more various points of the pipeline, or may seek to configure a static code analysis tool to be invoked upon a certain event occurring, e.g., a commit being made to the repository, a pull (or "merge") request being issued to the repository, etc. Again, in various embodiments, the selection of the static analysis tool to be used may be made once, periodically, or every time.

For example, the user 124 may use a user interface such as the exemplary one shown in FIG. 2, which is a diagram illustrating an exemplary user interface (UI) for user-configured static code analysis tool and configuration selection via codebase analysis according to some embodiments. This exemplary user interface is shown as part of an offering of a code pipeline service, which may allow the user to configure a static analysis tool utilization as part of a code pipeline. In this example a first UI element 202 allows the user to trigger a one-time analysis to identify a static analysis tool for a codebase, though the user has instead utilized a second UI element 204 that allows the user to configure a tool selection process for a code pipeline. The user may explicitly select a particular tool for use in the pipeline via UI elements 205/206 but may instead (indirectly or invisibly) make use of the SCAR service 120 via selecting UI element 207 (here, a radio button).

The user may then optionally select a set of static analysis tools that should be considered (or not be considered, which is not illustrated herein) as candidates—here, a set of UI elements 208 allow the user to select open-source tools, and another set of UI elements 210 allow the user to select tools requiring licenses. In the case of licensed tools, the user may select tools that the user already has licensed (and optionally, this may be pre-filled out based on known licenses associated with the user or an associated account) or may be willing to license—here, a set of tools are shown with asterisks indicating tools that are available for analysis and available within a software catalog service 118 (and optionally, can be automatically or easily licensed for the user, subject to user consent).

The user may also provide, via UI elements 212, a set of user preferences indicating what factors the user is most interested in, e.g., whether the user strongly desires a comparatively fast analysis time, a very thorough or aggressive tool, a tool that uses some comparatively low amount of resources (e.g., processing, memory, bandwidth), a tool having or not having a particular license (e.g., open-source tools, licensed tools), a relatively high rating associated with the tool (e.g., from user ratings, external ratings from other organizations, etc.).

Though non-illustrated, the user may also provide an identifier of the user code repository 140B (e.g., a URL or other resource identifier) which may or may not be internal to the provider network 100, and may provide instructions on how to compile the code.

Turning back to FIG. 1, at circle (B) the code analysis engine 128 may analyze the user code repository 140B to generate values for characteristics of the codebase, e.g., code length, code complexity, etc., as described herein. At circle (C), the code analysis engine 128 may use these values as inputs (or features) for use with the one or more ML models 122 to identify one or multiple static code analysis tools and corresponding configurations. At circle (D), data associated with the one or multiple static code analysis tools and corresponding configurations may optionally be provided back to the user via the electronic device 125.

Figure 3:
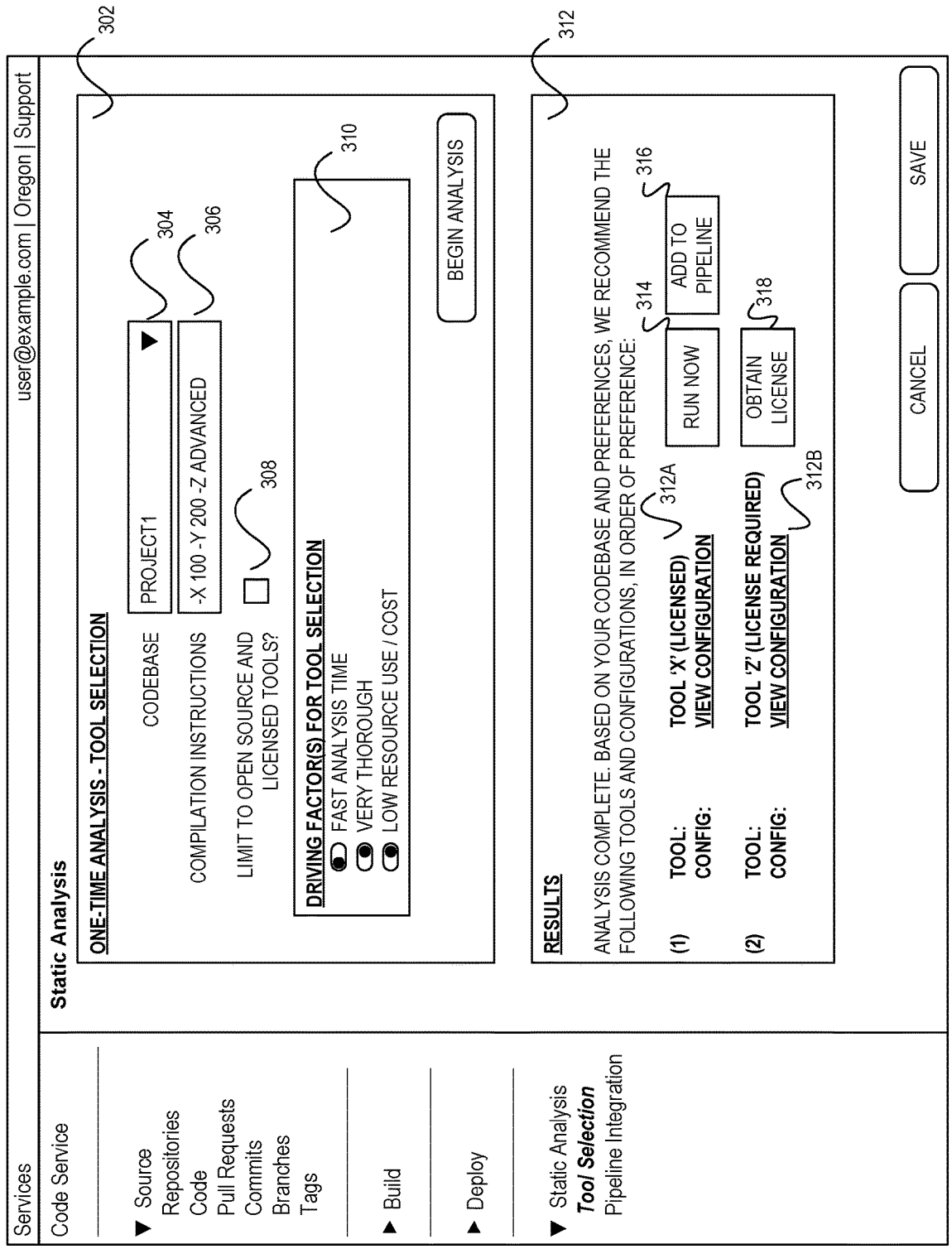
FIG. 3 is a diagram illustrating an exemplary user interface for one-time static code analysis tool and configuration recommendation via codebase analysis according to some embodiments.

For example, FIG. 3 is a diagram illustrating an exemplary user interface for one-time static code analysis tool and configuration recommendation via codebase analysis according to some embodiments. In this example, the user may have previously used UI element 302 to provide an indicator of the codebase 304, a set of compilation instructions 306, and an indicator (e.g., a checkbox indicating "yes") of whether the search should be limited to only considering open-source and already-licensed tools (here, the user selected "no"). The user may have also used UI elements 310 to indicate that the user highly desires a thorough (or in-depth) analysis as well as a low amount of resource utilization or cost required.

Thereafter, as reflected by optional circle (D) back in FIG. 1, the SCAR service 120 (or another code management service 102) may provide back a set of results; here, the results are shown in UI section 312 and indicate two different recommended tools/configuration pairs—an already-licensed "tool X" and configuration pair 312A and a non-licensed "tool Z" and configuration pair 312B. For the licensed pair 312A, the user may select a UI element 314 to run an analysis now using that tool and configuration, and/or may select a UI element 316 to add the tool and configuration to the code pipeline. For the non-licensed pair 312B, the user may select a UI element 318 to obtain a license (and thereafter, the UI 312 may be updated to show UI elements 314/316, for example) as shown by optional circle (E) in FIG. 1.

As shown, at some point (either immediately, or at a later time, such as responsive to another event), the SCAR service 120 may optionally, at circle (F), cause the selected analysis tool and associated configuration to be used, at optional circle (G), to analyze the user code repository 140B as requested.

Figure 4:
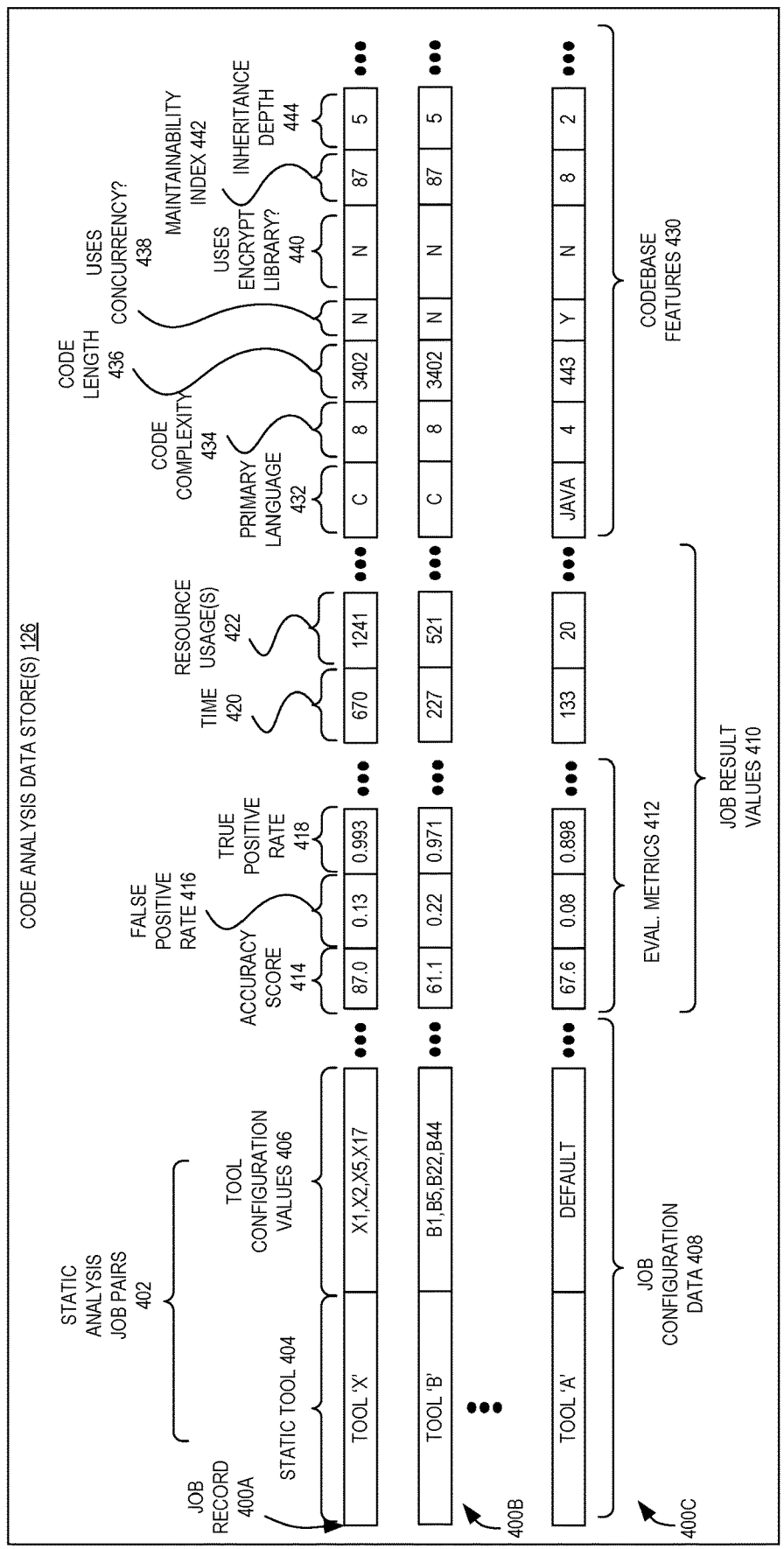
FIG. 4 is a diagram illustrating exemplary job records of a code analysis data store useful for static code analysis tool and configuration recommendation via codebase analysis according to some embodiments.

The selection of the static analysis tool and associated configuration, as described herein, may involve use of a ML model 122 and/or job records of a code analysis data store 126. For example, FIG. 4 is a diagram illustrating exemplary job records of a code analysis data store 126 useful for static code analysis tool and configuration recommendation via codebase analysis according to some embodiments. In this example, the code analysis data store 126 includes multiple job records 400A-400C corresponding to different runs of one or more static code analysis tools on one or more repositories (at one or more different states/versions, e.g., after different commits).

As described, each job record 400 corresponds to an analysis run, and has identifiers of the static tool 404 used and the tool configuration values 406, which together form a static analysis "job pair" 402, and may or may not be combined with other configuration settings (e.g., compute instances sizes, numbers, types, etc.) to be job configuration data 408.

Each job record 400 also includes one or more job result values 410, such as a number of evaluation metrics 412—e.g., an accuracy score 414, a false positive rate 416, a true positive rate 418, etc. The one or more job result values 410 may also include values such as a time 420 required for the analysis run, one or more amounts of resource utilization 422 (e.g., CPU usage, memory usage, bandwidth usage, etc.).

Each job record 400 also includes one or more codebase features 430 that are values of characteristics of the corresponding codebase. For example, the illustrated codebase features 430 include identifiers of a primary programming language 432 used in the codebase, a code complexity 434 score, a code length 436 (e.g., a number of lines of code), an indicator of whether the codebase uses concurrency 438 or an encryption library 440, a maintainability index 442 value generated by a maintainability function, an inheritance depth 444 value (e.g., a number of class hierarchies of a class used in the codebase), etc. Additionally or alternatively, codebase features 430 could include identifiers of particular properties of the used programming language, such as the use of anonymous functions, templates, function pointers, properties of the software's control flow graph, whether parallelism is utilized, etc.

In some embodiments, to generate a recommendation, the code analysis engine 128 may analyze the user codebase/repository as described above to generate values corresponding to the codebase features 430 and use these as input values to the ML model. This step may result in the ML model identifying some number (e.g., one, five, ten, etc.) of "nearby" or "similar" jobs, and may return identifiers of these jobs, complete or partial job records for these jobs, etc. The code analysis engine 128 may then use the user-provided preference data—e.g., whether the user prefers fast-running tools/configurations, thorough tools/configurations, low resource using tools/configurations, etc., to filter out ones of the initial "similar" jobs. The code analysis engine 128 may also perform sorting or filtering on its own, e.g., based on requiring a returned recommendation to be of a particular threshold accuracy amount, etc. With these resulting filtered and possibly ordered (e.g., based on accuracy or similar, and/or based on job result values corresponding to the user's job preferences that are the largest/smallest in the set), the codebase features 430 may use and/or return data describing the one or more tools and configurations.

Figure 5:
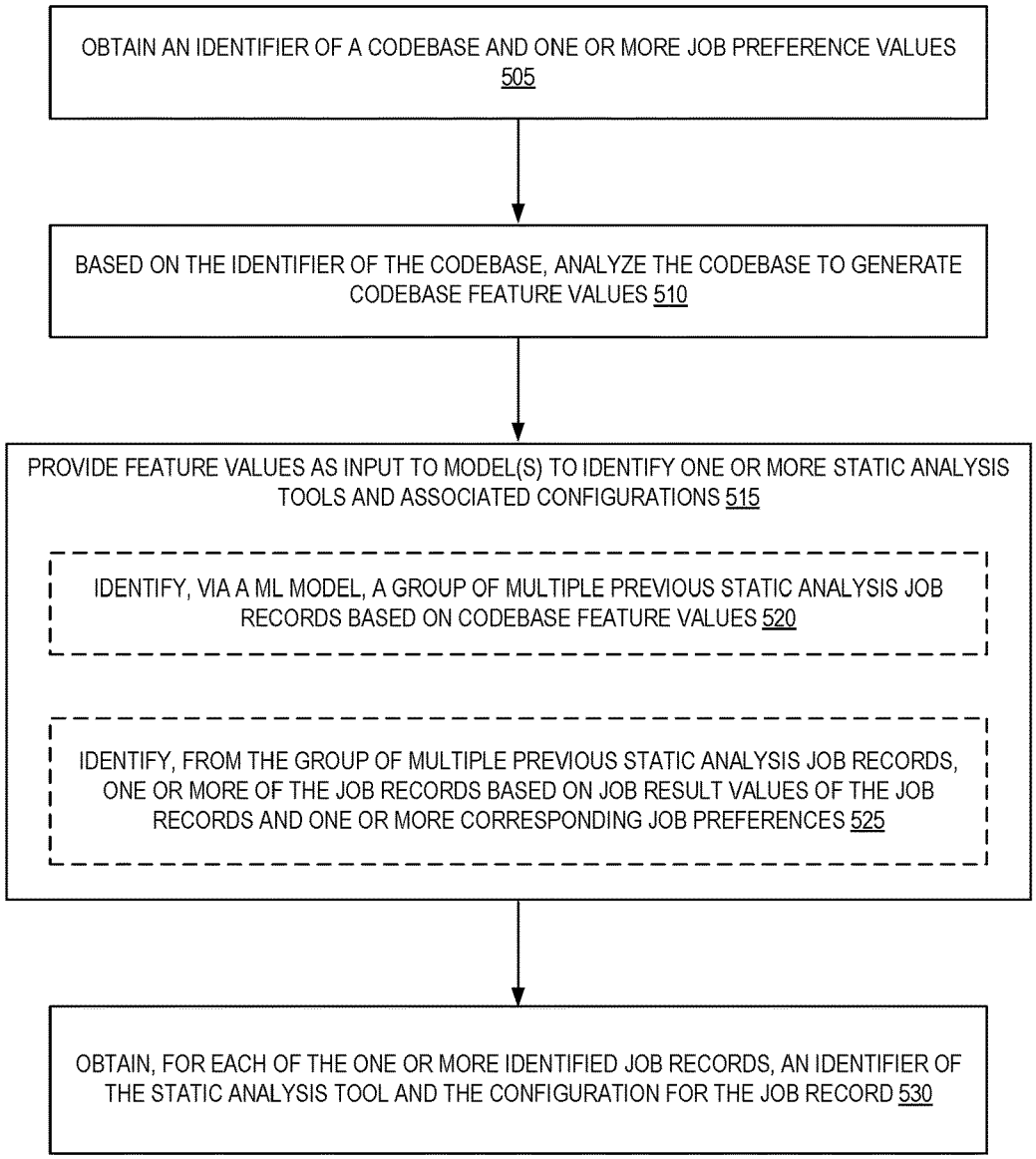
FIG. 5 is a flow diagram illustrating exemplary operations of a method for static code analysis tool and configuration recommendation via codebase analysis according to some embodiments.

FIG. 5 is a flow diagram illustrating exemplary operations 500 of a method for static code analysis tool and configuration recommendation via codebase analysis according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by components of the SCAR service 120 of the other figures.

The operations 500 include, at block 505, obtaining an identifier of a codebase and one or more job preference values. The identifier and the job preference values may be received in one or more request messages originated by a computing device of a user, which may occur responsive to the user providing user input via a user interface. The identifier of a codebase may be a URL pointing to a hosted codebase, a resource identifier that is unique within some context (e.g., a codebase ID used within a code service), etc., and the job preference values may be boolean type values (e.g., indicating important or not) or values having more than two particular settings (e.g., low, medium, high; an integer between 0-10; etc.). At block 510, the operations 500 include, based on the identifier of the codebase, analyzing the codebase to generate codebase feature values. In some embodiments, the identifier is used to obtain a copy of the codebase where the codebase feature values can then be generated therefrom, or to send a request for the codebase feature values.

The operations 500 include, at block 515, providing feature values as input to model(s) to identify one or more static analysis tools and associated configurations. Block 515 optionally includes block 520, and identifying, via a machine learning model (e.g., trained using a clustering algorithm or the like), a group of multiple previous static analysis job records based on codebase feature values, and/or block 525, identifying, from the group of multiple previous static analysis job records, one or more of the job records based on job result values of the job records and one or more corresponding job preferences—e.g., removing those records having a comparatively high execution time when a user's job preference is to have low execution times, or the like.

At block 530, the operations 500 include obtaining, for each of the one or more identified job records, an identifier of the static analysis tool and the configuration for the job record. These identifiers may be used to cause static analysis to be run on the codebase using at least one static analysis tool and the configuration, used to configure static analysis based on particular events, and/or provided via one or more messages to a computing device of the user to solicit an indication, from the user, of a tool and configuration to use.

Figure 6:
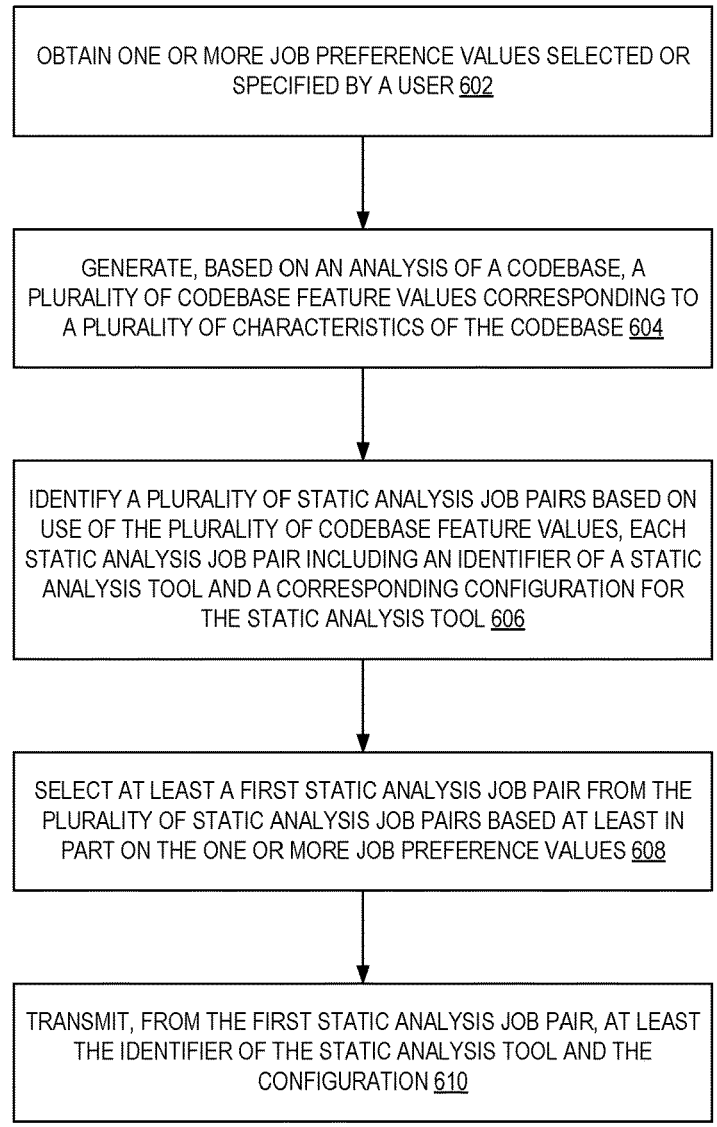
FIG. 6 is a flow diagram illustrating exemplary operations of a method for static code analysis tool and configuration recommendation via codebase analysis according to some embodiments.

FIG. 6 is a flow diagram illustrating exemplary operations 600 of a method for static code analysis tool and configuration recommendation via codebase analysis according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the SCAR service 120 of the other figures.

The operations 600 include, at block 602, obtaining one or more job preference values selected or specified by a user, and at block 604, generating, based on an analysis of a codebase, a plurality of codebase feature values corresponding to a plurality of characteristics of the codebase. In some embodiments, the one or more job preference values indicate at least one of: an importance of high static analysis thoroughness; an importance of low execution time; or an importance of low computing resource utilization. In some embodiments, the plurality of characteristics of the codebase include at least two of: a programming language used in the codebase; a code complexity of the codebase; or a code length of the codebase.

The operations 600 further include, at block 606, identifying a plurality of static analysis job pairs based on use of the plurality of codebase feature values, each static analysis job pair including an identifier of a static analysis tool and a corresponding configuration for the static analysis tool.

The operations 600 further include, at block 608, selecting at least a first static analysis job pair from the plurality of static analysis job pairs based at least in part on the one or more job preference values, and at block 610, transmitting, from the first static analysis job pair, at least the identifier of the static analysis tool and the configuration.

In some embodiments, block 608 includes analyzing, for each job preference value, one or more evaluation metrics from each of a plurality of job records corresponding to the plurality of static analysis job pairs, wherein the evaluation metrics were generated based on a previous evaluation of the corresponding static analysis tool with the corresponding configuration on a different codebase.

In some embodiments, block 610 includes transmitting the at least the identifier of the static analysis tool and the configuration to a computing device associated with the user, causing the identifier of the static analysis tool and the configuration to be presented to the user via a user interface.

In some embodiments, block 610 includes transmitting a plurality of identifiers of static analysis tools and a corresponding plurality of configurations, the plurality of identifiers of static analysis tools including the static analysis tool and the plurality of configurations including the configuration, causing the plurality of identifiers of static analysis tools and the corresponding plurality of configurations to be presented to the user.

In some embodiments, block 610 includes transmitting one or more messages to cause the static analysis tool and the configuration to be utilized in association with: a stage of a code deployment pipeline, a commit is submitted to a code repository service managing the codebase, or a pull request is received at the code repository service managing the codebase.

In some embodiments, the operations 600 further include: evaluating each of a plurality of software codebases with one or more static analysis tools using one or more configurations of job records, wherein each evaluation results in job record including one or more evaluation metrics indicating a performance result of the corresponding static analysis tool and configuration on the corresponding software codebase, and wherein each job record further includes a plurality of codebase features indicating characteristics of the corresponding software codebase; and training a machine learning (ML) model based at least in part on the plurality of job records, where identifying the plurality of static analysis job pairs is based on use of the ML model.

In some embodiments, the plurality of identifiers of static analysis tools are presented with one or more license indicators, wherein each of the one or more license indicators indicates that a corresponding static analysis tool: is an open source application; requires an associated license known to be held to the user; or requires an associated license known to be available to the user via a separate software catalog service.

In some embodiments, the operations 600 further include receiving a message originated by the computing device of the user identifying one of the plurality of static analysis tools and its corresponding configuration to be used to analyze the codebase; and causing the identified one static analysis tool and its corresponding configuration to be used at least once to analyze the codebase.

In some embodiments, the operations 600 further include receiving a request message originated by a computing device of the user, the request message including the one or more job preference values selected or specified by the user and further including identifiers of one or more static analysis tools that are to be considered during the identifying of the plurality of static analysis job pairs or are not to be considered during the identifying of the plurality of static analysis job pairs.

Figure 7:
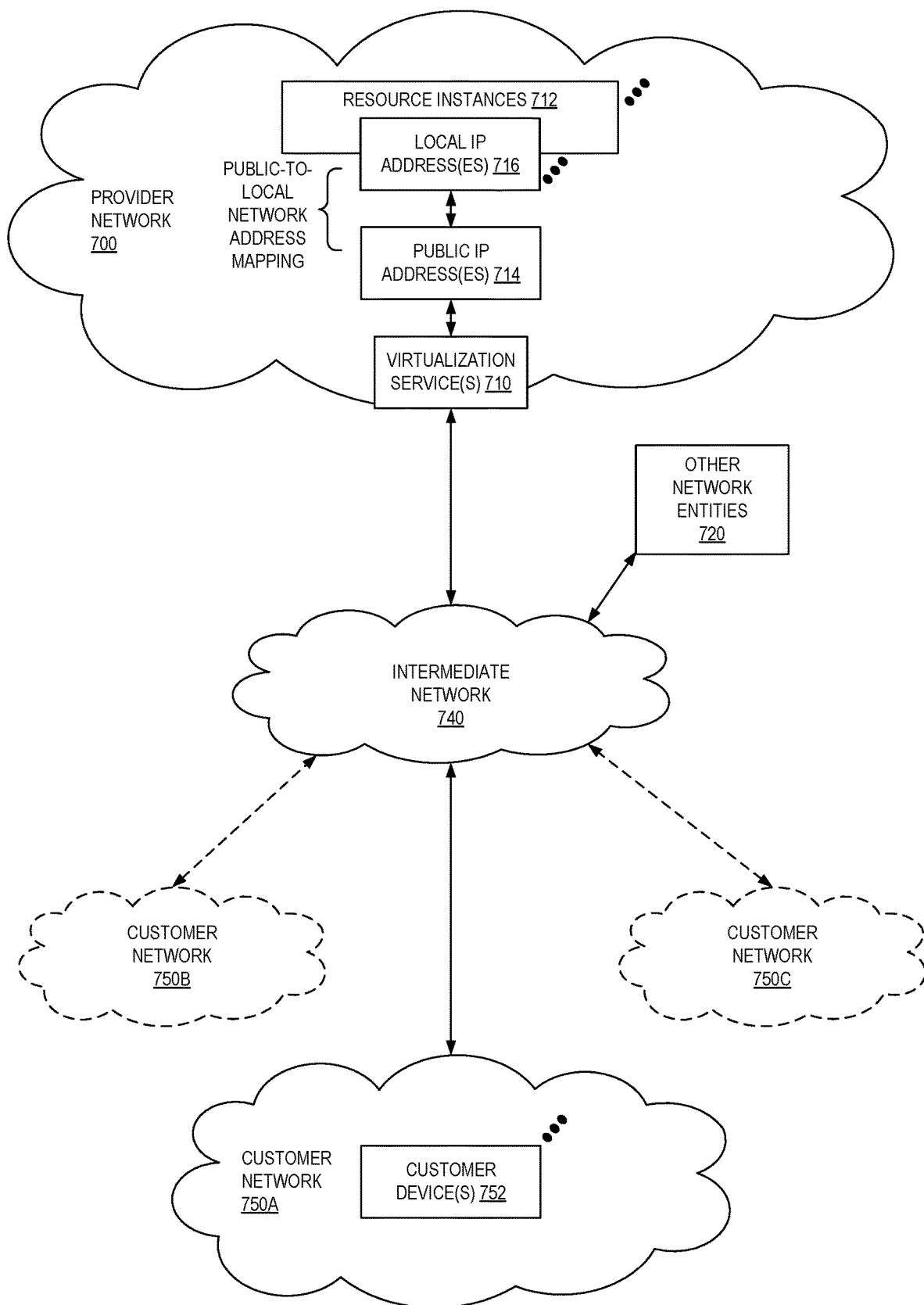
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
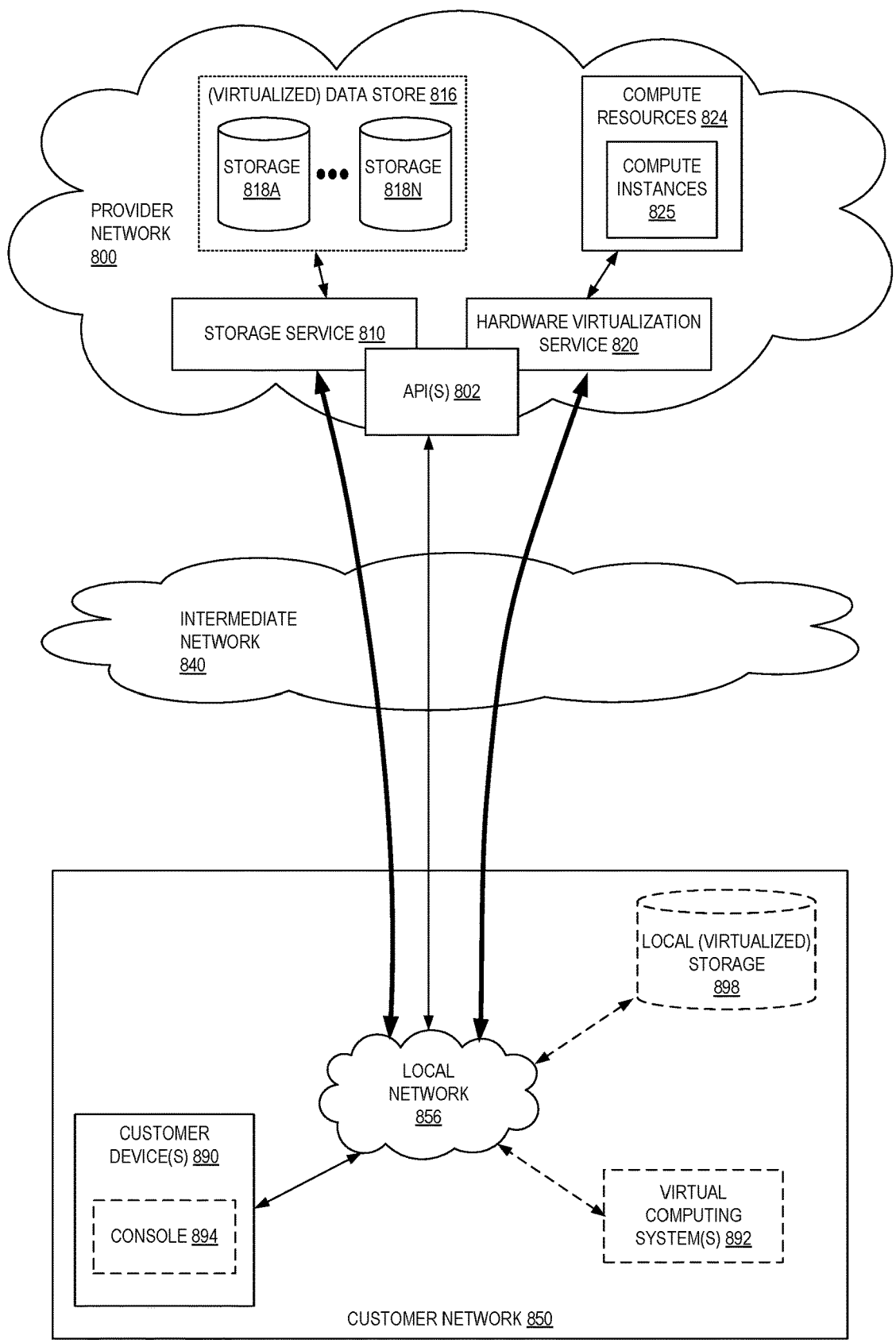
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
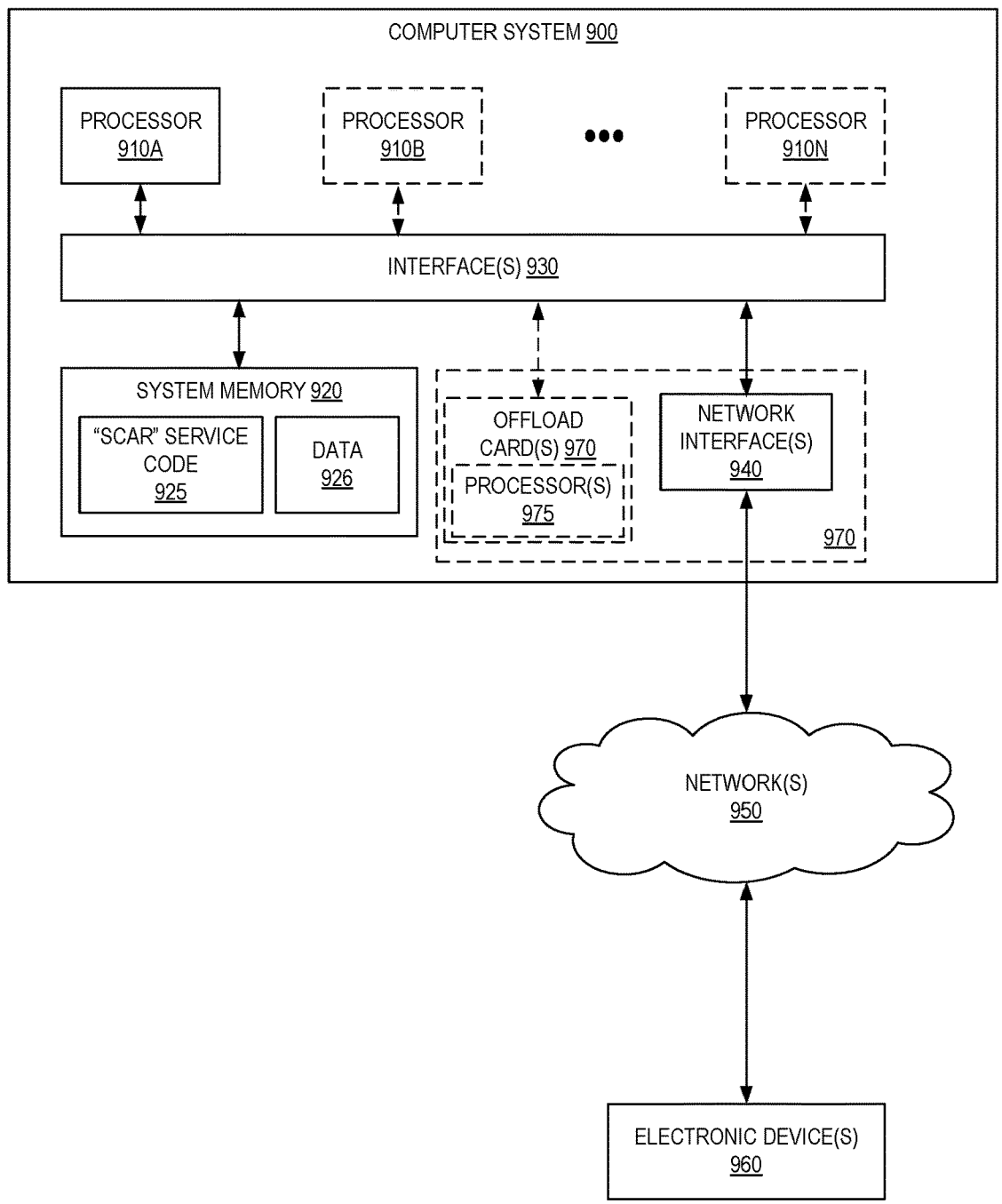
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as SCAR service code 925 (e.g., executable to implement, in whole or in part, the static code analysis recommendation service 120) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

evaluating a plurality of software codebases using a plurality of static analysis tools and sets of one or more static analysis tool configuration values to yield sets of codebase feature values, wherein each software codebase of the plurality of software codebases is evaluated using a respective static analysis tool of the plurality of a static analysis tools and a respective set of one or more static analysis tool configuration values of the sets of one or more static analysis tool configuration values;

training a machine learning (ML) model based on the sets of codebase feature values;

receiving an identifier of a codebase and one or more job preference values selected or specified by a user;

generating, based on an analysis of the codebase, a plurality of codebase feature values corresponding to a plurality of characteristics of the codebase;

identifying a plurality of static analysis job pairs based on providing the plurality of codebase feature values as input values to the trained machine learning (ML) model, each static analysis job pair including an identifier of a static analysis tool and a corresponding configuration for the static analysis tool;

selecting a subset of static analysis job pairs from the plurality of static analysis job pairs based on the one or more job preference values;

causing data based on the subset of static analysis job pairs to be presented, via a computing device, to the user;

receiving an identifier of one static analysis job tool and its associated configuration;

causing the one static analysis job tool and its associated configuration to be used to analyze the codebase for defects at least once; and wherein the method is performed by one or more electronic devices.

2. The computer-implemented method of claim 1, wherein:
 the plurality of characteristics of the codebase include at least two of:
  a programming language used in the codebase;
  a code complexity of the codebase;
  an operating system associated with the codebase; or
  a code length of the codebase; and
 the one or more job preference values indicate at least one of:
  an importance of high static analysis thoroughness;
  an importance of low execution time;
  a license associated with the static analysis tool;
  a rating associated with the static analysis tool; or
  an importance of low computing resource utilization.

3. A computer-implemented method comprising:
 evaluating a plurality of software codebases using a plurality of static analysis tools and sets of one or more static analysis tool configuration values to yield sets of codebase feature values, wherein each software codebase of the plurality of software codebases is evaluated using a respective static analysis tool of the plurality of a static analysis tools and a respective set of one or more static analysis tool configuration values of the sets of one or more static analysis tool configuration values;
 training a machine learning (ML) model based on the sets of codebase feature values;
 obtaining one or more job preference values selected or specified by a user;
 generating, based on an analysis of a codebase, a plurality of codebase feature values corresponding to a plurality of characteristics of the codebase;
 identifying, using the trained ML model, a plurality of static analysis job pairs based on providing the plurality of codebase feature values as input to the trained ML model, each static analysis job pair including an identifier of a static analysis tool and a corresponding configuration for the static analysis tool;
 selecting at least a first static analysis job pair from the plurality of static analysis job pairs based on the one or more job preference values;
 transmitting, from the first static analysis job pair, at least the identifier of the static analysis tool and the configuration; and
 wherein the method is performed by one or more electronic devices.

4. The computer-implemented method of claim 3, wherein the plurality of characteristics of the codebase include at least two of:
 a programming language used in the codebase;
 a code complexity of the codebase; or
 a code length of the codebase.

5. The computer-implemented method of claim 3, wherein the one or more job preference values indicate an importance of at least one of:
 the tool and configuration providing a low false positive rate;
 whether the tool requires compilation;
 the tool and configuration providing having a high static analysis thoroughness or aggressiveness;
 the tool and configuration providing low execution time; or
 the tool and configuration requiring low computing resource utilization.

6. The computer-implemented method of claim 5, wherein the selecting at least the first static analysis job pair from the plurality of static analysis job pairs based on the one or more job preference values includes:
 analyzing, for each job preference value, one or more evaluation metrics from each of a plurality of job records corresponding to the plurality of static analysis job pairs, wherein the evaluation metrics were generated based on a previous evaluation of the corresponding static analysis tool with the corresponding configuration on a different codebase.

7. The computer-implemented method of claim 3, wherein transmitting, from the first static analysis job pair, at least the identifier of the static analysis tool and the configuration comprises:
 transmitting the at least the identifier of the static analysis tool and the configuration to a computing device associated with the user, causing the identifier of the static analysis tool and the configuration to be presented to the user via a user interface.

8. The computer-implemented method of claim 7, wherein transmitting the at least the identifier of the static analysis tool and the configuration comprises:
 transmitting a plurality of identifiers corresponding to a plurality of static analysis tools and a corresponding plurality of configurations, the plurality of identifiers of static analysis tools including the static analysis tool and the plurality of configurations including the configuration, causing the plurality of identifiers of static analysis tools and the corresponding plurality of configurations to be presented to the user.

9. The computer-implemented method of claim 8, wherein the plurality of identifiers of static analysis tools are presented with one or more license indicators, wherein each of the one or more license indicators indicates that a corresponding static analysis tool:
 is an open source application;
 requires an associated license known to be held to the user; or
 requires an associated license known to be available to the user via a separate software catalog service.

10. The computer-implemented method of claim 8, further comprising:
 receiving a message originated by the computing device of the user identifying one of the plurality of static analysis tools and its corresponding configuration to be used to analyze the codebase; and
 causing the identified one static analysis tool and its corresponding configuration to be used at least once to analyze the codebase.

11. The computer-implemented method of claim 3, wherein transmitting, from the first static analysis job pair, at least the identifier of the static analysis tool and the configuration comprises:
 transmitting one or more messages to cause the static analysis tool and the configuration to be utilized in association with:
  a stage of a code deployment pipeline,
  a commit is submitted to a code repository service managing the codebase, or
  a pull request is received at the code repository service managing the codebase.

12. The computer-implemented method of claim 3, further comprising:
 receiving a request message originated by a computing device of the user, the request message including the one or more job preference values selected or specified by the user and further including identifiers of one or more static analysis tools that are to be considered during the identifying of the plurality of static analysis job pairs or are not to be considered during the identifying of the plurality of static analysis job pairs.

13. A system comprising:
a first one or more electronic devices to execute applications in a multi-tenant provider network; and
a second one or more electronic devices to implement a static code analysis recommendation service in the multi-tenant provider network, the static code analysis recommendation service including instructions that upon execution cause the static code analysis recommendation service to:
evaluate a plurality of software codebases using a plurality of static analysis tools and sets of one or more static analysis tool configuration values to yield sets of codebase feature values, wherein each software codebase of the plurality of software codebases is evaluated using a respective static analysis tool of the plurality of a static analysis tools and a respective set of one or more static analysis tool configuration values of the sets of one or more static analysis tool configuration values;
train a machine learning (ML) model based on the sets of codebase feature values;
obtain one or more job preference values selected or specified by a user;
generate, based on an analysis of a codebase, a plurality of codebase feature values corresponding to a plurality of characteristics of the codebase;
identify, using the trained ML model, a plurality of static analysis job pairs based on providing the plurality of codebase feature values as input to the trained ML model, each static analysis job pair including an identifier of a static analysis tool and a corresponding configuration for the static analysis tool;
select at least a first static analysis job pair from the plurality of static analysis job pairs based on the one or more job preference values; and
cause the first one or more electronic devices to execute the static analysis tool of the first static analysis job pair using the configuration of the first static analysis job pair to analyze the codebase.

14. The system of claim 13, wherein the plurality of characteristics of the codebase include at least two of:
a programming language used in the codebase;
a code complexity of the codebase; or
a code length of the codebase.

15. The system of claim 13, wherein the one or more job preference values indicate at least one of:
an importance of high static analysis thoroughness;
an importance of low execution time; or
an importance of low computing resource utilization.

16. The system of claim 13, wherein:
the static code analysis recommendation service, to select at least the first static analysis job pair from the plurality of static analysis job pairs, is to select a second plurality of static analysis job pairs based on the one or more job preference values, the second plurality of static analysis job including the first static analysis job pair; and
the instructions upon execution further cause the static code analysis recommendation service to:
transmit data identifying the second plurality of static analysis job pairs to a computing device of the user, to cause the computing device to present the data to the user via a user interface.

17. The system of claim 16, wherein the instructions upon execution further cause the static code analysis recommendation service to:
receive a message originated by the computing device of the user identifying the static analysis tool of the first static analysis job pair and its corresponding configuration as selected to be used to analyze the codebase.

18. The system of claim 13, wherein the first one or more electronic devices are caused to execute the static analysis tool of the first static analysis job pair using the configuration of the first static analysis job pair to analyze the codebase:
as part of a stage of a code deployment pipeline;
upon a commit being submitted to a code repository service managing the codebase; or
upon a pull request being received at the code repository service managing the codebase.

19. The method of claim 3, further comprising:
evaluating the plurality of software codebases using the plurality of static analysis tools and sets of one or more static analysis tool configuration values to yield sets of job result values; and
selecting at least the first static analysis job pair from the plurality of static analysis job pairs based on the one or more job preference values and one or more sets of job result values of the sets of job result values.

20. The method of claim 3, further comprising:
evaluating the plurality of software codebases using the plurality of static analysis tools and sets of one or more static analysis tool configuration values to yield sets of evaluation metrics; and
selecting at least the first static analysis job pair from the plurality of static analysis job pairs based on the one or more job preference values and one or more sets of evaluation metrics of the sets of evaluation metrics.

* * * * *